United States Patent Office 2,990,426
Patented June 27, 1961

2,990,426
EPIMERIZATION PROCESS FOR ANHYDROTETRACYCLINE
Murray Arthur Kaplan, Syracuse, N.Y., assignor, by mesne assignments, to Bristol-Myers Company, New York, N.Y., a corporation of Delaware
No Drawing. Filed July 1, 1957, Ser. No. 668,918
2 Claims. (Cl. 260—559)

This invention relates to an amphoteric antibacterial compound, metal and acid addition salts thereof and methods of preparing the same.

It is the object of the present invention to provide an antibacterial compound effective against both gram-positive and gram-negative bacteria and particularly against tetracycline-resistant strains of *Micrococcus pyogenes* var. *aureus*.

The objects of the present invention have been achieved by the provision of a solid, substantially pure member selected from the group consisting of an amphoteric antibacterial compound having the empirical formula $$C_{22}H_{22}N_2O_7$$

and in the form of its crystalline hydrochloride melting at about 213°–215° C. and having $[\alpha]_D^{25}$ of $-538°$ (C=0.5 in 0.1 N HCl in a mixture of equal volumes of methanol and water) and non-toxic metal and acid addition salts thereof.

The antibacterial compound of the present invention is probably anhydroepitetracycline, i.e. the C4 epimer of anhydrotetracycline, but this is a matter of theory and the invention is not dependent thereon nor restricted thereto.

The crystalline hydrated hydrochloride of the compound of the present invention is best prepared by dissolving 50 to 150 mgm. per ml. of crystalline ammonium epitetracycline in cold 6 N hydrochloric acid or a mixture of equal volumes of concentrated hydrochloric acid and isopropyl alcohol. The compound crystallizes out after stirring in the cold for about 15 minutes and is collected by filtration, washed with water and dried in vacuo.

The ammonium epitetracycline used as the starting material is prepared in the following manner:

A solution containing 250 mg. tetracycline hydrochloride in dimethylacetamide, containing 1 to 2 percent W/V of sodium bisulfite in suspension, is maintained in the dark at room temperature for a period of two to four weeks. The aged solution is filtered to remove insolubles and is added with vigorous stirring to 5 to 10 volumes of methyl isobutyl ketone. The resulting amorphous precipitate, containing 60 to 70 percent epitetracycline, is collected by filtration, washed with methyl isobutyl ketone and lower alkanes (Skellysolve B) and air dried at 50° C. The crude epitetracycline hydrochloride is then dissolved in water at a pH of 4.5 to 7.0 (using ammonium hydroxide to adjust) and at a concentration of from 150 to 200 mgm./ml. This solution is seeded with tetracycline base and allowed to crystallize with slow stirring at room temperature for two to four hours. The precipitate of tetracycline base containing approximately 30 to 40 percent epitetracycline is removed by filtration. The mother liquor contains approximately 80 to 90 percent of epitetracycline which is isolated as crystalline ammonium epitetracycline from the mother liquid or filtrate by the direct addition of one volume of concentrated ammonium hydroxide and one volume of acetone.

Ammonium epitetracycline of approximately 98% purity, as determined by circular chromatography, is made by recrystallization from concentrated ammonium hydroxide at a concentration of 100 to 200 mg./ml.

Ammonium epitetracycline is a yellow crystalline solid with a melting point of 161°–162° C. (uncorrected).

The compound of the present invention is also prepared by either of the following rapid and convenient equilibration procedures:

(1) Tetracycline or anhydrotetracycline or epitetracycline is heated at 70° C. to 90° C. at a concentration of 1 mg. to 5 mg. per ml. in 1 to 2 N hydrochloric acid for a period of five minutes to one hour.

(2) A solution of a mixture of tetracycline hydrochloride, ascorbic acid and magnesium chloride in propylene glycol is stored at 45° C. to 56° C. for a period of two to four weeks.

Under these two conditions an equilibrium, as determined by circular paper chromatography, is obtained consisting of 40 to 60 percent anhydrotetracycline, 25 to 35 percent of the compound of this invention and 15 to 25 percent substance A.

Substance A, although identified by chromatography, has not yet been isolated in sufficient purity for identification and evaluation.

If desired, the compound of the present invention is isolated from such equilibration mixtures. Thus, the procedure used for the identification and isolation, alone or in mixtures, of epitetracycline, anhydrotetracycline, tetracycline and the compound of this invention is essentially a macro circular chromatogram. A one inch circle is drawn with soft pencil in the center of a 24 cm. circular filter paper (Whatman #1) and a ¼ by ¾ inch wick is cut from the center of the circle. The paper is then passed through a buffer solution consisting of three volumes of 0.2 molar $NaH_2PO_4$ and seven volumes of 0.1 molar citric acid. The wet paper is then blotted between paper towels. To the one inch central circle on the damp buffered paper is added 0.1 ml. of an aqueous or solvent solution of a mixture containing 0.5 to 5.0 mg. per ml. of epitetracycline, anhydrotetracycline, tetracycline and the compound.

The paper is then supported on an eight inch aluminum of Pyrex pie plate with the central wick dipping into a small dish containing a mixture of three volumes pyridine, ten volumes benzene and twenty volumes of nitromethane. A nine and one-half inch Pyrex pie plate is then placed over the paper and the system is allowed to develop for one hour at room temperature. The paper is then air dried and placed on a glass plate over an ultraviolet light source. For a development period of one hour, the compound and the other tetracycline forms separate from each other as concentric circles which are readily observed under the ultraviolet light source. Anhydrotetracycline moves fastest as the solvent front. The relative distances moved for each of the tetracycline forms are listed in Table 1 below. Each of the concentric circles are outlined in soft pencil, cut from the paper and homogenized in 50 ml. of 0.1 hydrochloric acid for two to five minutes. The paper is then removed by filtration through glass giving filtrates containing in pure form only one of the components of the mixture. The compound of the present invention is isolated in pure form from the appropriate filtrate in the usual manner, e.g. by lyophilization.

TABLE 1

*Separation by circular paper strip chromatography*

| Substance | Distance moved (1 hour), cm. |
|---|---|
| Substance A | 2.0 |
| Epitetracycline | 2.5 |
| Tetracycline | 4.5–5 |
| Compound of this invention | 5–5.5 |
| Anhydrotetracycline | 6.5–7 |

The compound of this invention is precipitated in amphoteric form from solutions in strong aqueous acid or base by adjusting the pH to near neutrality. Metal salts, e.g. sodium, potassium, calcium, magnesium and the like are obtained from the amphoteric form by treatment with strong alkali as was the case with tetracycline. Acid addition salts of organic and inorganic acids such as the hydrochloride, nitrate, sulfate, orthophosphate, hydriodide, hydrobromine, citrate, benzoate, formate, succinate, tartrate, maleate, acetate, sulfamate, glycollate, cinnamate, mandelate, malate and ascorbate are prepared by the procedures used to prepare the corresponding salts of tetracycline, e.g. the hydrochloride is prepared by dissolving the amphoteric compound in aqueous hydrochloric acid at about pH 2.0.

The antibacterial spectrum of the compound of this invention as the hydrochloride dihydrate is as follows:

| Organism | Minimum Inhibitory Concentration in mcg./ml. |
| --- | --- |
| Micrococcus pyogenes var. aureus #209 | 0.8 |
| Tetracycline-resistant pyogenes var. aureus #209 WR188 [1] | 0.63 |
| Gaffkya tetragena | 0.8 |
| Streptococcus pyogenes C-203 [2] | 2.0 |
| Streptococcus fecalis | 6.2 |
| α-Streptococcus #28003 | 1.6 |
| Streptococcus agalactiae | 0.8 |
| Diplococcus pneumoniae [2] | 0.8 |
| Lactobacillus acidophilus #4356 [3] | 8.0 |
| Lactobacillus casei #4646 [3] | 8.0 |
| Bacillus anthracis | 0.8 |
| Bacillus subtilis | 2.0 |
| Corynebacterium xerosis | 0.4 |
| Clostridium welchii [4] | 1.0 |
| Salmonella typhosa | 8.0 |
| Escherichia coli | 8.0 |
| Escherichia coli #27825 | 8.0 |
| Shigella sonnei | 1.0 |
| Klebsiella pneumoniae | 8.0 |
| Pseudomonas pyocyaneus | 250 |
| Pseudomonas aeruginosa | 50 |
| Proteus species #28017 | 50 |
| Proteus vulgaris | |
| Proteus vulgaris #329 | 1.25 |
| Neisseria species | 4 |
| Candida albicans | 625 |

[1] M.I.C. for tetracycline hydrochloride is 31 mcg./ml. and for ammonium epitetracycline is 50–100 mcg./ml.
[2] Heart infusion+10% serum used.
[3] Tomato juice broth used.
[4] Thioglycollate broth used.

In the standard tetracycline bio-assays versus *S. aureus* (turbidometric), *B. subtilis* (plate) and *B. cereus* (plate) in the usual units of mcg./mgm. of tetracycline hydrochloride equivalents, the compound of the present invention as the hydrochloride dihydrate has a potency of 40–70 mcg./mgm.

The compound of the present invention as the hydrochloride dihydrate exhibits LD$_{50}$ 500 mgm./kg. i.p. in the white mouse and an i.p. CD$_{50}$ of 19 mgm./kg. against *Diplococcus pneumoniae*.

The compounds of this invention are useful antibacterial agents. They are thus of value in solutions, e.g. at 0.1 to 1.0 percent, to remove bacteria from laboratory glassware. They are useful in therapy, both orally and topically, in man and animals when the infection is caused by bacteria. They are particularly useful in solution or suspension at concentrations of 0.01 to 1.0 percent in agar plates used for testing for the presence of fungi, e.g. monilia, in cultures such as those taken from human subjects which also contain gram-positive and gram-negative bacteria including staphylococci which have become resistant to tetracycline.

The compound of the present invention is a useful agent for the detection of contamination by fungi, yeasts and the like in the course of the commercial production of the enzymes Streptokinase and Streptodornase by the growth of Streptococci and the production of amylase by fermentation of *B. subtilis* or *B. cereus*. Thus, the addition of 10 to 1000 mcg./ml., and preferably about 10 mcg./ml., of the compound to an aliquot of inoculated medium, followed by incubation, permits the growth of undesirable contaminants and their visual detection.

The compound of the present invention is slightly soluble in water and moderately soluble in acetone, the lower alcohols, dimethylformamide and some concentrated salt solutions. The hydrochloride of the compound crystallizes as a deep orange dihydrate from water-isopropyl alcohol.

The invention is more specifically illustrated by the following examples but is not to be limited thereto.

EXAMPLE 1

Crystalline ammonium epitetracycline (500 mgm.) is dissolved in 5 ml. of a mixture of equal volumes of concentrated hydrochloric acid and isopropyl alcohol cooled in an ice bath. The resulting solution is cooled and stirred for 15 minutes. The hydrochloride of the compound of this invention precipitates, usually as a dihydrate, and is collected by filtration, washed with water and dried in vacuo.

EXAMPLE 2

Crystalline ammonium epitetracycline (500 mgm.) is dissolved in 5 ml. of 6 Normal hydrochloric acid cooled in an ice bath. The resulting solution is cooled and stirred for 15 minutes. The hydrochloride of the compound of this invention precipitates as a dihydrate and is collected by filtration, washed with water and dried in vacuo.

Calc'd for anhydrous $C_{22}H_{22}N_2O_7 \cdot HCl$: C, 57.32; H, 4.97; N, 6.05; Cl, 7.8. Found on an anhydrous basis: C, 57.2, 57.4; H, 4.86, 5.04; N, 5.9; Cl, 7.8, 7.94. Percent volatiles as water at 100° C. in vacuo: 8.3, 8.6., M.P. 213°–215° C. (uncorrected) with decomposition. Optical rotation $[\alpha]_D^{25}$ is −538° (C=0.5 in 0.1 N HCl in 1/1 methanol water) and −537° (C=0.5 in Cellosolve). The compound of this invention exhibited ultraviolet absorption maxima in 0.1 N HCl at 428 m$\mu$ $$(E_1^{1\%} \text{ cm.}=119)$$

and 273 m$\mu$ ($E_1^{1\%}$ cm.=750).

EXAMPLE 3

Ammonium epitetracycline (0.5 g.) was dissolved in 10 ml. of 6 N HCl. Within 5 minutes a heavy, gelatinous precipitate of the hydrochloride of the compound of this invention precipitated, and was collected by filtration, washed with 2 N HCl and air-dried (250 mgm.).

I claim:

1. The process of preparing a solid, substantially pure, crystalline antibacterial compound having the empirical formula $C_{22}H_{22}N_2O_7$—HCl—$2H_2O$, melting at about 213°–215° C. and having $[\alpha]_D^{25}$ of −538° (c=0.5 in 0.1 N HCl in a mixture of equal volumes of methanol and water) which comprises dissolving ammonium epitetracycline in cold 6 N hydrochloric acid at a concentration of at least 5 percent by weight and collecting said, solid, crystalline antibacterial compound after it forms and precipitates.

2. The process of preparing a solid, substantially pure, crystalline antibacterial compound having the empirical formula $C_{22}H_{22}N_2O_7$—HCl—$2H_2O$, melting at about 213°–215° C. and having $[\alpha]_D^{25}$ of −538° (c=0.5 in 0.1 N HCl in a mixture of equal volumes of methanol and water) which comprises dissolving crystalline ammonium epitetracycline at a concentration of at least 5 percent by weight in 6 N hydrochloric acid at about 0° C. and collecting said solid, crystalline antibacterial compound after it forms and precipitates.

References Cited in the file of this patent

UNITED STATES PATENTS 2,739,924    Lein                  Mar. 27, 1956
2,791,609    Kaplan               May 17, 1957

(Other references on following page)

FOREIGN PATENTS

| | | |
|---|---|---|
| 166,216 | Australia | Dec. 5, 1955 |
| 744,020 | Great Britain | Jan. 25, 1956 |
| 513,471 | Canada | June 7, 1955 |
| 1,090,743 | France | Oct. 20, 1954 |

OTHER REFERENCES

Boothe et al.: Antibiotics Annual, 1953, pp. 46–48.

Boothe et al.: J. Am. Chem. Soc., Vol. 75, p. 4621 (1953).

Conover et al.: J. Am. Chem. Soc., Vol. 75, pp. 4622–3 (1953).

Doerschuk et al.: J. Am. Chem. Soc., Vol. 77, p. 4687, 1955.

Fieser and Fieser: Organic Chemistry, 2nd Ed. (1950), p. 32.

Gailliot et al.: Compt. Rendus, 27th Cong. Intern. Chim. Ind. Brussels, Vol. 3, pp. 506–8, Sept. 11, 1954.

McCormick et al.: J. Am. Chem. Soc., Vol. 79, pp. 2849–58, June 5, 1957.

Stephens et al.: J. Am. Chem. Soc., Vol. 76, pp. 3570–3571; 3573–5 (1954).

Stephens et al.: J. Am. Chem. Soc., Vol. 78, pp. 1515–16, April 1956.

Waller et al.: J. Am. Chem. Soc., Vol. 74, pp. 4981–2 (1952).